United States Patent
Zhang et al.

(10) Patent No.: US 11,951,862 B1
(45) Date of Patent: Apr. 9, 2024

(54) SYSTEM FOR TESTING ASSIST FUNCTION OF ELECTRIC VEHICLE WIRELESS POWER TRANSFER

(71) Applicant: CATARC NEW ENERGY VEHICLE TEST CENTER (TIANJIN) CO., LTD., Tianjin (CN)

(72) Inventors: Baoqiang Zhang, Tianjin (CN); Fang Wang, Tianjin (CN); Zhaohui Wang, Tianjin (CN); Bin Fan, Tianjin (CN); Xin Huang, Tianjin (CN); Jianbo Wang, Tianjin (CN); Yang Li, Tianjin (CN); Yue Xu, Tianjin (CN); Meng Zhang, Tianjin (CN); Xiao Li, Tianjin (CN)

(73) Assignee: CATARC NEW ENERGY VEHICLE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/361,941

(22) Filed: Jul. 31, 2023

(30) Foreign Application Priority Data

Sep. 19, 2022 (CN) .......................... 202211134701.5

(51) Int. Cl.
*H02J 7/00* (2006.01)
*B60L 53/124* (2019.01)
(Continued)

(52) U.S. Cl.
CPC ............. *B60L 53/38* (2019.02); *B60L 53/124* (2019.02); *B60L 53/126* (2019.02); *H02J 50/005* (2020.01); *H02J 50/60* (2016.02)

(58) Field of Classification Search
CPC ...... B60L 53/38; B60L 53/124; B60L 53/126; H02J 50/005
(Continued)

(56) References Cited

U.S. PATENT DOCUMENTS 5,821,731 A * 10/1998 Kuki ..................... H02J 7/0045
320/108
8,912,687 B2    12/2014 Kesler et al.
(Continued)

FOREIGN PATENT DOCUMENTS

| CN | 110053499 A | 7/2019 |
| CN | 110988573 A | 4/2020 |

*Primary Examiner* — Zixuan Zhou
(74) *Attorney, Agent, or Firm* — True Shepherd LLC; Andrew C. Cheng

(57) ABSTRACT

A system for testing an assist function of electric vehicle wireless power transfer includes: a pit, a vehicle-assembly support platform, and an electromagnetic field strength measurement instrument. A ground-assembly support platform is arranged inside the pit, the vehicle-assembly support platform is arranged on an upper side of the ground-assembly support platform, and a to-be-tested member is arranged on an upper side of the ground-assembly support platform. A ground-assembly device coil is arranged on an upper surface of the ground-assembly support platform, a vehicle-assembly device coil is arranged inside the vehicle-assembly support platform, the ground-assembly device coil charges an entire vehicle, and the ground-assembly device coil further cooperates with the vehicle-assembly device coil to charge a vehicle component. A mechanical arm is arranged on ground of a test site, an interference member is arranged on a front end of the mechanical arm.

7 Claims, 2 Drawing Sheets

(51) Int. Cl.
  *B60L 53/126* (2019.01)
  *B60L 53/38* (2019.01)
  *H02J 50/00* (2016.01)
  *H02J 50/60* (2016.01)
(58) Field of Classification Search
  USPC .......................................... 320/108; 307/104
  See application file for complete search history.

(56) References Cited

U.S. PATENT DOCUMENTS

| | | | |
|---|---|---|---|
| 9,496,732 B2 | 11/2016 | Partovi | |
| 2017/0008411 A1* | 1/2017 | Wu | B60L 53/65 |
| 2017/0033615 A1 | 2/2017 | Asanuma et al. | |

\* cited by examiner

SYSTEM FOR TESTING ASSIST FUNCTION OF ELECTRIC VEHICLE WIRELESS POWER TRANSFER

CROSS-REFERENCE TO RELATED APPLICATIONS

This application claims priority to Chinese Patent Application No. 202211134701.5 with a filing date of Sep. 19, 2022. The content of the aforementioned application, including any intervening amendments thereto, is incorporated herein by reference.

TECHNICAL FIELD

The present disclosure belongs to the field of vehicle wireless charging, and in particular, relates to a system for testing an assist function of electric vehicle wireless power transfer.

BACKGROUND

Compared with conventional conductive charging, wireless charging for electric vehicles has the advantages of high reliability, low maintenance cost, strong adaptability to environment, and high convenience in charging, and it is hence the most promising technical solution to resolve the problem of automatic charging for electric vehicles. During the operation of the wireless charging system for electric vehicles, a high-frequency magnetic field will be generated between a vehicle assembly coil and a ground assembly coil. If a metallic foreign object is input into the high-frequency magnetic field, heat is continuously generated under the action of the strong magnetic field, resulting in safety risks of burn and fire. In addition, electromagnetic radiation generated during the operation of the wireless charging system further affects surrounding organisms. Therefore, the assist function of foreign object detection and live object protection is very important for the wireless charging system of electric vehicles, and performance of the assist function directly determines safety of the wireless charging system of electric vehicles.

At present, the released Chinese national standards "Electric Vehicle Wireless Power Transfer-Part 6: Interoperability Requirements and Testing-Ground side" and "Electric Vehicle Wireless Power Transfer-Part 7: Interoperability Requirements and Testing-Vehicle side" respectively propose requirements on testing of the foreign object detection and live object protection. It is analyzed according to the standard content that firstly, there are a large quantity of test steps, and the test workload is huge with specific repeatability; and secondly, the requirements on testing of the live object protection are relatively strict, which are mainly reflected in simulating an invasion speed and angle of a living body. There is no device that meets the requirements on testing of the live object protection, and there is no device that meets both the requirements on testing of the foreign body detection and the live object protection on the market.

Based on the foregoing, it is necessary to design a system that is capable of testing the assist functions of the foreign object detection and live object protection during electric vehicle wireless power transfer, so as to promote the high-quality development of the industry.

SUMMARY OF PRESENT INVENTION

An objective of the present disclosure is to provide a system for testing an assist function of electric vehicle wireless power transfer, and specifically discloses a system and method for testing the assist functions of live object protection and foreign object detection.

To achieve the above objective, the present disclosure adopts the following technical solution.

In one aspect, the disclosure provides a system for testing an assist function of electric vehicle wireless power transfer, including: a to-be-tested member, a pit, a ground-assembly support platform, a vehicle-assembly support platform, and an electromagnetic field strength measurement instrument, where the ground-assembly support platform is arranged inside the pit, the vehicle-assembly support platform is arranged on an upper side outside the pit and corresponds to the ground-assembly support platform, the to-be-tested member is arranged on an upper side of the ground-assembly support platform, and the to-be-tested member includes an entire vehicle or a vehicle component;

a ground-assembly device coil of a vehicle wireless charging system is arranged on an upper surface of the ground-assembly support platform, a vehicle-assembly device coil of the wireless charging system is arranged inside the vehicle-assembly support platform, the ground-assembly device coil cooperates with the entire vehicle having the vehicle-assembly device to establish an entire vehicle test environment for entire vehicle charging, and the ground-assembly device coil further cooperates with the vehicle-assembly device coil to establish a vehicle component test environment for vehicle component charging;

a mechanical arm is arranged on ground of a test site, an interference member is arranged on a front end of the mechanical arm, and the mechanical arm is configured to drive the interference member to move in a wireless charging environment on the upper side of the pit; and the electromagnetic field strength measurement instrument is arranged corresponding to the to-be-tested member.

In one embodiment, a lifting platform is arranged between a bottom surface of the pit and the ground-assembly support platform, in the entire vehicle test environment, the lifting platform controls the ground-assembly support platform to rise and descend to implement on-ground mounting or in-ground mounting, where the on-ground mounting is that the lifting platform drives an upper surface of the ground-assembly device coil to be flush with ground, and the in-ground mounting is that the lifting platform drives a lower surface of the ground-assembly device coil to be flush with the ground of the test site; and in the vehicle component test environment, the vehicle component is arranged on an upper surface of the vehicle-assembly support platform, the lifting platform drives the ground-assembly support platform to rise, a lifting rod is vertically arranged in a middle of an upper side of the vehicle-assembly support platform, the lifting rod drives the vehicle-assembly support platform to descend, and a distance between the ground-assembly support platform and the vehicle-assembly support platform is adjusted to be within an preset threshold.

In one embodiment, a width of the pit is less than a distance between two wheels of a passenger car.

In one embodiment, the mechanical arm is a six-degree-of-freedom mechanical arm, and a movable platform is arranged on a lower side of the mechanical arm, an electromagnetic field strength measurement instrument probe is arranged on the front end of the mechanical arm;

the interference member includes a foreign object simulation equipment and a living body simulation equipment;

the foreign object simulation equipment includes small metallic objects such as a paper clip, a coin, and a key; and the living body simulation equipment is a physiological saline ball.

A power supply terminal of a power supply cable and a control terminal of a control cable of the mechanical arm may be arranged on the top of the test site to prevent winding of cables.

The movable platform may adopt an automated guided vehicle (AGV) trolley, and the movable platform cooperates with the mechanical arm to implement 360° rotation in a horizontal direction and 180° movement in a vertical direction.

A camera may be arranged on the front end of the mechanical arm, and the camera is mounted to record whether the foreign object simulation equipment is sent to a specified position.

A temperature measurement instrument may be arranged on the front end of the mechanical arm, and the remote temperature measurement instrument is configured to record a temperature rise of the foreign object simulation equipment.

In another aspect, the disclosure provides a method for testing an assist function of electric vehicle wireless power transfer using the above system, including the following steps:

S1: preparing the test site, wherein the test site includes a first site for establishing the entire vehicle test environment and a site for establishing the vehicle component test environment;

S2: establishing a moving track of a mechanical arm, wherein a length of the to-be-tested member is set to M, a width thereof is set to N, M is greater than N, an extending length of the mechanical arm is set to L, and L is greater than 0.5M and L is greater than 0.5N, if L is greater than M, one test region is set, if L is greater than N and L is less than M, two test regions are set, if L is less than M and L is less than N, four test regions are set, a geometric center of the test region or a vertex of the test site is used as an initial point of the mechanical arm, and if there is only one test region, the movable platform remains stationary in a test process, and a moving track of the foreign object simulation equipment is capable of covering the test region by controlling the mechanical arm;

if there are two test regions, the movable platform sequentially moves the mechanical arm to two long sides of the to-be-tested member during the test process, and the moving track of the foreign object simulation equipment is capable of covering one test region by controlling the mechanical arm on each long side; and if there are four test regions, the movable platform sequentially moves the mechanical arm to a left front side, a right front side, a left rear side, and a right rear side of the to-be-tested member during the test process, and the moving track of the foreign object simulation equipment is capable of covering one test region by controlling the mechanical arm on each side;

S3: arranging an electromagnetic field strength measurement instrument probe on the front end of the mechanical arm, and determining a live object protection test region, which comprising the following steps:

S31: establishing a coordinate system by using a central axis of the ground-assembly device as an X direction, testing an electromagnetic field (EMF) value in the X direction, and using a point on an X axis corresponding to a set EMF limit value as a zero point in the X direction;

S32: respectively testing the EMF value test in positive and negative directions of a Y axis, changing a height interval along a Z axis, and recording EMF values in a Y direction corresponding to a same X coordinate value and different Z coordinate values;

S33: sequentially selecting a plurality of X coordinate values on the X axis, and repeating step S2 for each of the plurality of X coordinate values;

S34: connecting coordinate points corresponding to all EMF limit values obtained in step S31 and step S32 to a plane; and S35: uniformly expanding the plane outward by 10 cm, to obtain the live object protection test region; and S4: arranging the living body simulation equipment on the front end of the mechanical arm in the live object protection test region, and recording a live object protection test response on each test point, wherein if the living body simulation equipment enters the live object protection test region, the system sends a response, and vice versa.

In one embodiment, the preparing the test site in step S1 specifically includes:

during establishment of the entire vehicle test environment, controlling, by a lifting platform, the ground-assembly support platform to rise and descend to implement on-ground mounting or in-ground mounting, where the on-ground mounting is that the lifting platform drives an upper surface of a ground-assembly device coil to be flush with ground, and the in-ground mounting is that the lifting platform drives a lower surface of the ground-assembly device coil to be flush with the ground of the test site, and stopping the to-be-tested vehicle on an upper side of the pit, wherein two wheels of the to-be-tested vehicle are respectively located on the ground of the test site on two sides of the pit along a width direction of the pit; and in the vehicle component test environment, arranging the vehicle component on the upper surface of the vehicle-assembly support platform, driving, by the lifting platform, the ground-assembly support platform to rise, vertically arranging a lifting rod in a middle of an upper side of the vehicle-assembly support platform, driving, by the lifting rod, the vehicle-assembly support platform to descend, where a distance between the ground-assembly support platform and the vehicle-assembly support platform is adjusted to be within an preset threshold, and arranging the to-be-tested member on an upper side of the ground-assembly device coil.

Compared with the prior art, the test system for the assist function of wireless electric vehicle charging according to the present disclosure has the following beneficial effects:

In the test system for the assist function of wireless electric vehicle charging according to the present disclosure, both component-level assist function test of a wireless charging system and entire vehicle-level assist function test of the wireless charging system can be performed in a same test site, to greatly save a space in the test site and investment in test hardware. Through cooperation of the mechanical arm and the AGV trolley, a complex test scenario of 360° in the horizontal direction and 180° in the vertical direction can be achieved, difficult manual test or test that cannot be completed can be implemented, an automatic test can be achieved, a test cycle can be shortened, test personnel can be free, and limited human resources can be fully utilized. The test system can resolve a large quantity of repeated test actions, easy to operate, improve test efficiency, ensure test accuracy, and make the assist function test simpler.

BRIEF DESCRIPTION OF THE DRAWINGS

The accompanying drawings which constitute a part of the description of the present disclosure are intended to provide further understanding of the present disclosure. The exemplary embodiments of the present disclosure and descriptions thereof are intended to be illustrative of the present disclosure and do not constitute an undue limitation of the present disclosure. In the accompanying drawings.

REFERENCE NUMERALS

11—entire vehicle; 12—vehicle component; 2—pit; 3—ground-assembly support platform; 4—vehicle-assembly support platform; 5—ground-assembly device coil; 6—mechanical arm; 7—lifting platform; and 8—movable platform; 9—vehicle-assembly device coil; 10—interference member.

DETAILED DESCRIPTION OF THE EMBODIMENTS

It should be noted that embodiments in the present disclosure or features in the embodiments may be combined with one another without conflict.

It should be understood that in the description of the present disclosure, terms such as "central", "longitudinal", "transverse" "upper", "lower", "front", "rear", "left", "right" "vertical", "horizontal", "top", "bottom", "inside" and "outside" indicate the orientations or positional relationships based on the drawings, and these terms are merely intended to facilitate and simplify the description of the present disclosure, rather than to indicate or imply that the mentioned apparatus or element must have a specific orientation or must be constructed and operated in a specific orientation, and thus cannot be construed as limitations to the present disclosure. Moreover, terms such as "first" and "second" are used only for the purpose of description and cannot be understood as indicating or implying relative importance or implicitly indicating the number of technical features denoted. Thus, features defined with "first" and "second" may explicitly or implicitly include one or more of the features. In the description of the present disclosure, unless otherwise specified, "a plurality of" means two or more.

In the description of the present disclosure, it should be noted that, unless otherwise clearly specified, meanings of terms "mount", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two elements. A person of ordinary skill in the art may understand specific meanings of the above terms in the present disclosure based on a specific situation.

The present disclosure will be described in detail below with reference to the drawings and the embodiments.

Figure 1:
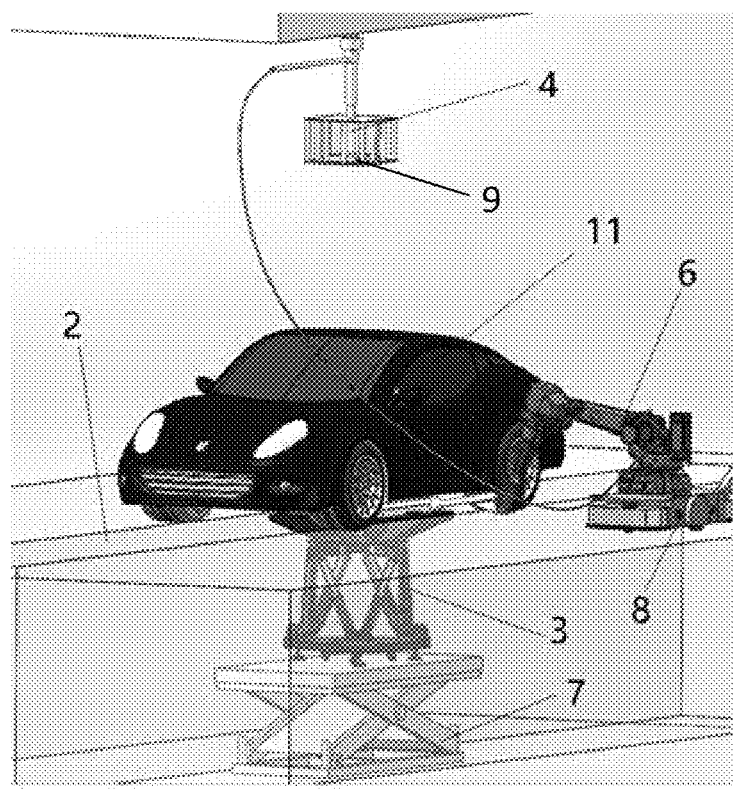
FIG. 1 is a schematic structural diagram showing an entire vehicle test according to an embodiment of the present disclosure.
Figure 2:
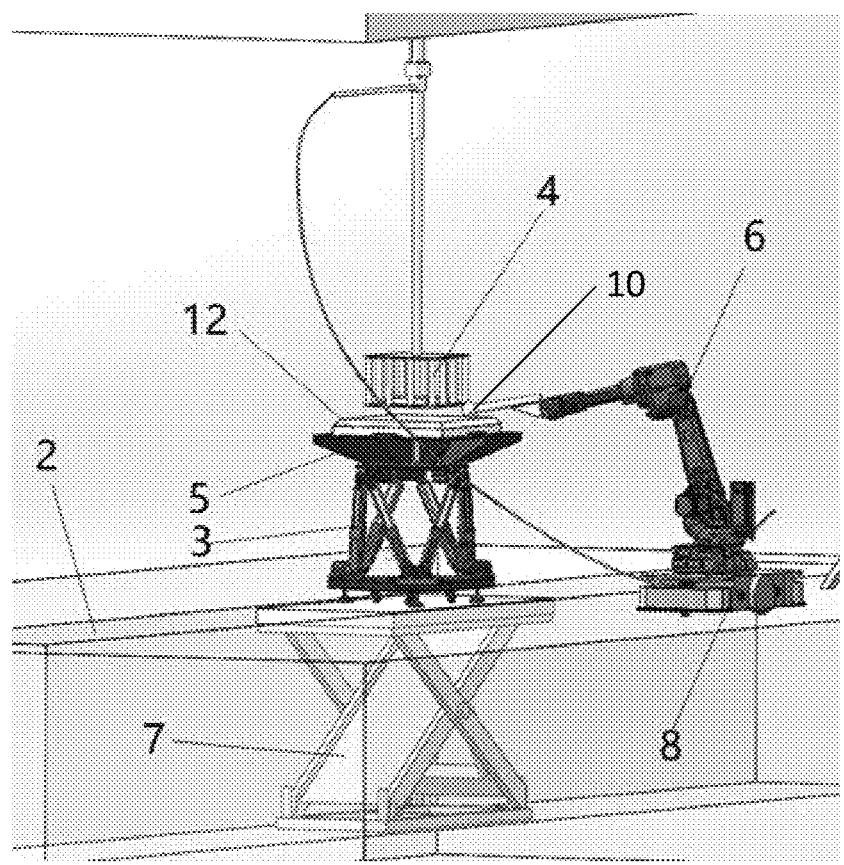
FIG. 2 is a schematic structural diagram showing a vehicle component test according to an embodiment of the present disclosure.

As shown in FIG. 1 and FIG. 2, a system for testing an assist function of electric vehicle wireless power transfer includes a to-be-tested member, a pit, a ground-assembly support platform, a vehicle-assembly support platform, and an electromagnetic field strength measurement instrument. The ground-assembly support platform is arranged inside the pit, the vehicle-assembly support platform is arranged on an upper side outside the pit and corresponds to the ground-assembly support platform, the to-be-tested member is arranged on an upper side of the ground-assembly support platform, and the to-be-tested member includes an entire vehicle or a vehicle component.

A ground-assembly device coil of a vehicle wireless charging system is arranged on an upper surface of the ground-assembly support platform, a vehicle-assembly device coil of the wireless charging system is arranged inside the vehicle-assembly support platform, the ground-assembly device coil cooperates with the entire vehicle having the vehicle-assembly device to establish an entire vehicle test environment for entire vehicle charging, and the ground-assembly device coil further cooperates with the vehicle-assembly device coil to establish a vehicle component test environment for vehicle component charging.

A mechanical arm is arranged on ground of a test site, an interference member is arranged on a front end of the mechanical arm, and the mechanical arm is configured to drive the interference member to move in a wireless charging environment on the upper side of the pit.

The electromagnetic field strength measurement instrument is arranged corresponding to the to-be-tested member.

As shown in FIG. 1 and FIG. 2, a lifting platform is arranged between a bottom surface of the pit and the ground-assembly support platform.

In the entire vehicle test environment, the lifting platform controls the ground-assembly support platform to rise and descend to implement on-ground mounting or in-ground mounting, where the on-ground mounting is that the lifting platform drives an upper surface of the ground-assembly device coil to be flush with ground, and the in-ground mounting is that the lifting platform drives a lower surface of the ground-assembly device coil to be flush with the ground of the test site.

In the vehicle component test environment, the vehicle component is arranged on the upper surface of the vehicle-assembly support platform, the lifting platform drives the ground-assembly support platform to rise, a lifting rod is vertically arranged in a middle of an upper side of the vehicle-assembly support platform, the lifting rod drives the vehicle-assembly support platform to descend, and a distance between the ground-assembly support platform and the vehicle-assembly support platform is adjusted to be within an preset threshold.

A depth of the pit, a lifting height of the lifting platform, and a height of the ground-assembly support platform of the wireless charging system are matched.

A width of the pit should be less than a distance between two wheels of a passenger car.

The width of the pit may be 1.2 mm.

As shown in FIG. 1 and FIG. 2, the mechanical arm is a six-degree-of-freedom mechanical arm, and a movable platform is arranged on a lower side of the mechanical arm.

An electromagnetic field strength measurement instrument probe is arranged on the front end of the mechanical arm.

The interference member includes a foreign object simulation equipment and a living body simulation equipment.

The foreign object simulation equipment includes small metallic objects such as a paper clip, a coin, and a key.

The living body simulation equipment is a physiological saline ball.

A power supply terminal of a power supply cable and a control terminal of a control cable of the mechanical arm may be arranged on the top of the test site to prevent winding of cables.

The movable platform may adopt an AGV trolley, and the movable platform cooperates with the mechanical arm to implement 360° rotation in a horizontal direction and 180° movement in a vertical direction.

As shown in FIG. 1 and FIG. 2, a camera is arranged on the front end of the mechanical arm, and the camera is mounted to record whether the foreign object simulation equipment is sent to a specified position.

Whether the foreign object simulation equipment is sent to the specified position is recorded to ensure authenticity, effectiveness, and traceability of test data.

A temperature measurement instrument may be arranged on the front end of the mechanical arm, and the remote temperature measurement instrument is configured to record a temperature rise of the foreign object simulation equipment.

A remote non-contact temperature measurement instrument may be selected as the temperature measurement instrument, to record the temperature rise of the foreign object simulation equipment to verify whether a function of a tested member meets a standard requirement.

As shown in FIG. 1 and FIG. 2, a method for testing an assist function of electric vehicle wireless power transfer using the above system specifically includes the following steps.

S1. Prepare the test site, where the test site includes a first site for establishing the entire vehicle test environment and a site for establishing the vehicle component test environment.

S2. Establish a moving track of a mechanical arm for detection and test of a to-be-tested vehicle or a to-be-tested vehicle component.

A length of a to-be-tested member is set to M, a width thereof is set to N, M is greater than N, an extending length of the mechanical arm is set to L, and L is greater than 0.5M and L is greater than 0.5N.

If L is greater than M, one test region is set.

If L is greater than N and L is less than M, two test regions are set.

If L is less than M and L is less than N, four test regions are set.

A geometric center of the test region or a vertex of the test site is used as an initial point of the mechanical arm.

If there is only one test region, the movable platform remains stationary in a test process, and the moving track of the foreign object simulation equipment is capable of covering the test region by controlling the mechanical arm.

If there are two test regions, the movable platform should sequentially move the mechanical arm to two long sides of the to-be-tested member during the test process, and the moving track of the foreign object simulation equipment is capable of covering one test region by controlling the mechanical arm on long each side. When the mechanical arm is on one of the two long sides of the to-be-tested member, test is conducted in one of the two test regions, and then the movable platform moves the mechanical arm to the other one of the two long sides of the to-be-tested member, test is conducted in the other one of the two test regions.

If there are four test regions, the movable platform should sequentially move the mechanical arm to a left front side, a right front side, a left rear side, and a right rear side of the to-be-tested member during the test process, and the moving track of the foreign object simulation equipment is capable of covering one test region by controlling the mechanical arm on each side.

S3. Arrange an electromagnetic field strength measurement instrument probe on the front end of the mechanical arm, and determine a live object protection test region, which comprising the following steps.

S31. Establish a coordinate system by using a central axis of the ground-assembly device as an X direction, test an EMF value in the X direction, and use a point on an X axis corresponding to a set EMF limit value as a zero point in the X direction.

S32. Respectively test the EMF value test in positive and negative directions of a Y axis, change a height interval along a Z axis, and record EMF values in a Y direction corresponding to a same X coordinate value and different Z coordinate values.

S33. Sequentially select a plurality of X coordinate values on the X axis, and repeat step S2 for each of the plurality of X coordinate values.

S34. Connect coordinate points corresponding to all EMF limit values obtained in step S31 and step S32 to a plane.

S35. Uniformly expand the plane outward by 10 cm to obtain the live object protection test region.

S4. Arrange the living body simulation equipment on the front end of the mechanical arm in the live object protection test region, and record a live object protection test response on each test point, wherein if the living body simulation equipment enters the live object protection test region, the system sends a response, and vice versa.

In one embodiment, the preparing the test site in step S1 specifically includes the following steps:

During establishment of the entire vehicle test environment, a lifting platform controls a ground-assembly support platform to rise and descend to implement on-ground mounting or in-ground mounting. The on-ground mounting is that the lifting platform drives an upper surface of the ground-assembly device coil to be flush with ground, and the in-ground mounting is that the lifting platform drives a lower surface of the ground-assembly device coil to be flush with the ground of the test site. The to-be-tested vehicle is stopped on an upper side of the pit. Two wheels of the to-be-tested vehicle are respectively located on the ground of the test site on two sides of the pit along a width direction of the pit.

The on-ground mounting or the in-ground mounting is selected based on a requirement of test personnel.

In the vehicle component test environment, the vehicle component is arranged on the upper surface of the vehicle-assembly support platform, the lifting platform drives the ground-assembly support platform to rise, a lifting rod is vertically arranged in a middle of an upper side of the vehicle-assembly support platform, the lifting rod drives the vehicle-assembly support platform to descend, where a distance between the ground-assembly support platform and the vehicle-assembly support platform is adjusted to be within an preset threshold, and the to-be-tested member is arranged on an upper side of the ground-assembly device coil.

The above described are merely preferred embodiments of the present disclosure, and not intended to limit the present disclosure. Any modifications, equivalent replacements and improvements made within the spirit and principle of the present disclosure should all fall within the scope of protection of the present disclosure.

What is claimed is:

1. A system for testing an assist function of electric vehicle wireless power transfer, comprising: a to-be-tested member, a pit, a ground-assembly support platform, a vehicle-assembly support platform, and an electromagnetic field strength measurement instrument, wherein the ground-assembly support platform is arranged inside the pit, the vehicle-assembly support platform is arranged on an upper side outside the pit and corresponds to the ground-assembly support platform, the to-be-tested member is arranged on an upper side of the ground-assembly support platform, and the to-be-tested member comprises an entire vehicle or a vehicle component;
   a ground-assembly device coil of a vehicle wireless charging system is arranged on an upper surface of the ground-assembly support platform, a vehicle-assembly device coil of the vehicle wireless charging system is arranged inside the vehicle-assembly support platform, the ground-assembly device coil cooperates with the entire vehicle having the vehicle-assembly device coil to establish an entire vehicle test environment for entire vehicle charging, and the ground-assembly device coil further cooperates with the vehicle-assembly device coil to establish a vehicle component test environment for vehicle component charging;
   a mechanical arm is arranged on ground of a test site, an interference member is arranged on a front end of the mechanical arm, the mechanical arm is configured to drive the interference member to move in a wireless charging environment on the upper side of the pit, and the interference member comprises a foreign object simulation equipment and a living body simulation equipment;
   the mechanical arm is a six-degree-of-freedom mechanical arm;
   a movable platform is arranged on a lower side of the mechanical arm, and the movable platform cooperates with the mechanical arm to implement 360° rotation in a horizontal direction and 180° movement in a vertical direction; and
   the electromagnetic field strength measurement instrument is arranged corresponding to the to-be-tested member.

2. The system according to claim 1, wherein a lifting platform is arranged between a bottom surface of the pit and the ground-assembly support platform;
   in the entire vehicle test environment, the lifting platform controls the ground-assembly support platform to rise and descend to implement on-ground mounting or in-ground mounting, the on-ground mounting is that the lifting platform drives an upper surface of the ground-assembly device coil to be flush with the ground, and the in-ground mounting is that the lifting platform drives a lower surface of the ground-assembly device coil to be flush with the ground of the test site; and
   in the vehicle component test environment, the vehicle component is arranged on an upper surface of the vehicle-assembly support platform, the lifting platform drives the ground-assembly support platform to rise, a lifting rod is vertically arranged in a middle of an upper side of the vehicle-assembly support platform, the lifting rod drives the vehicle-assembly support platform to descend, and a distance between the ground-assembly support platform and the vehicle-assembly support platform is adjusted to be within a preset threshold.

3. The system according to claim 1, wherein a width of the pit is less than a distance between two wheels of a passenger car.

4. The system according to claim 1, wherein
   the foreign object simulation equipment comprises small metallic objects comprising a paper clip, a coin, and a key; and
   the living body simulation equipment is a physiological saline ball.

5. The system according to claim 1, wherein a camera is arranged on the front end of the mechanical arm, and the camera is mounted to record whether the foreign object simulation equipment is sent to a specified position.

6. A method for testing an assist function of electric vehicle wireless power transfer using system according to claim 1, comprising:
   S1: preparing the test site, wherein the test site comprises a first site for establishing the entire vehicle test environment and a second site for establishing the vehicle component test environment;
   S2: establishing a moving track of the mechanical arm, wherein a length of the to-be-tested member is set to M, a width thereof is set to N, M is greater than N, an extending length of the mechanical arm is set to L, and L is greater than 0.5M and L is greater than 0.5N,
   if L is greater than M, one test region is set,
   if L is greater than N and L is less than M, two test regions are set,
   if L is less than M and L is less than N, four test regions are set,
   a geometric center of the test region or a vertex of the test site is used as an initial point of the mechanical arm;
   if there is only one test region, the movable platform remains stationary in a test process, and a moving track of the foreign object simulation equipment is capable of covering the test region by controlling the mechanical arm;
   if there are two test regions, the movable platform sequentially moves the mechanical arm to two long sides of the to-be-tested member during the test process, and the moving track of the foreign object simulation equipment is capable of covering one test region by controlling the mechanical arm on each long side; and
   if there are four test regions, the movable platform sequentially moves the mechanical arm to a left front side, a right front side, a left rear side, and a right rear side of the to-be-tested member during the test process, and the moving track of the foreign object simulation equipment is capable of covering one test region by controlling the mechanical arm on each side;
   S3: arranging an electromagnetic field strength measurement instrument probe on the front end of the mechanical arm, and determining a live object protection test region, which comprising the following steps:

S31: establishing a coordinate system by using a central axis of the ground-assembly device as an X direction, testing an electromagnetic field (EMF) value in the X direction, and using a point on an X axis corresponding to a set EMF limit value as a zero point in the X direction;

S32: respectively testing the EMF value in positive and negative directions of a Y axis, changing a height interval along a Z axis, and recording EMF values in a Y direction corresponding to a same X coordinate value and different Z coordinate values;

S33: sequentially selecting a plurality of X coordinate values on the X axis, and repeating step S2 for each of the plurality of X coordinate values;

S34: connecting coordinate points corresponding to all EMF limit values obtained in step S31 and step S32 to a plane; and S35: uniformly expanding the plane outward by 10 cm to obtain the live object protection test region; and S4: arranging the living body simulation equipment on the front end of the mechanical arm in the live object protection test region, and recording a live object protection test response on each test point, wherein if the living body simulation equipment enters the live object protection test region, the system sends a response, and vice versa.

7. The method according to claim 6, wherein the preparing a test site in step S1 specifically comprises:

during establishment of the entire vehicle test environment, controlling, by a lifting platform, the ground-assembly support platform to rise and descend to implement on-ground mounting or in-ground mounting, wherein the on-ground mounting is that the lifting platform drives an upper surface of the ground-assembly device coil to be flush with ground, and the in-ground mounting is that the lifting platform drives a lower surface of the ground-assembly device coil to be flush with the ground of the test site, and stopping the to-be-tested vehicle on an upper side of the pit, wherein two wheels of the to-be-tested vehicle are respectively located on the ground of the test site on two sides of the pit along a width direction of the pit; and in the vehicle component test environment, arranging the vehicle component on an upper surface of the vehicle-assembly support platform, driving, by the lifting platform, the ground-assembly support platform to rise, vertically arranging a lifting rod in a middle of an upper side of the vehicle-assembly support platform, driving, by the lifting rod, the vehicle-assembly support platform to descend, wherein a distance between the ground-assembly support platform and the vehicle-assembly support platform is adjusted to be within an preset threshold, and arranging the to-be-tested member on an upper side of the ground-assembly device coil.

\* \* \* \* \*